3,265,688
METHOD FOR PREPARING SUBSTITUTED MORPHOLINES
Fred Keller, Northridge, Calif., assignor to Rexall Drug and Chemical Company, Los Angeles, Calif., a corporation of Delaware
No Drawing. Filed Apr. 15, 1963, Ser. No. 272,860
1 Claim. (Cl. 260—247)

This invention relates to compositions of matter classified in the art of chemistry as substituted morpholines, to a process for making such compositions and to intermediates obtained in the synthesis.

The invention sought to be patented, in its final product composition aspect, is described as residing in the concept of a chemical compound of the formula:

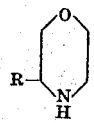

wherein R is phenyl-lower alkyl, for example benzyl, phenethyl, α-ethylbenzyl, phenyl-n-butyl, phenyl-n-hexyl and the like, and to the pharmaceutically acceptable non-toxic acid-addition and quaternary ammonium salts thereof.

The invention sought to be patented, in a first intermediate composition aspect, resides in the concept of a chemical compound of the formula:

R—CH—CH$_2$—OH
  |
  NH—C—CH$_2$—X
      ||
      O wherein R is as described above and X is halogen, such as chlorine, bromine or iodine.

The invention sought to be patented, in a second intermediate composition aspect, resides in the concept of a chemical compound of the formula:

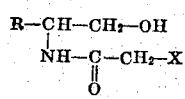

wherein R is as described above.

As used throughout the specification and in the claims the term "lower alkyl" embraces straight and branched chain alkyl radicals containing 1 to 6 carbon atoms.

The tangible embodiments of this invention, in its first and second intermediate composition aspects and in the form of the acid addition salts of its final product composition aspect, possess the inherent general physical characteristics of being crystalline solids. Analytical data, which reveal no unsaturation except as present in the benzene ring, taken together with the nature of the starting materials and the mode of synthesis, positively confirm the structure of the compounds sought to be patented.

The tangible embodiments of this invention, in its first and second intermediate composition aspects, possess the inherent applied use characteristics of being useful and valuable as chemical intermediates in the synthesis of the tangible embodiments of this invention in its final product composition aspect by reaction sequences to be described hereinafter.

The tangible embodiments of this invention, in its final product composition aspects, possess the inherent applied use characteristics of having significant pharmacological activity as central nervous system depressants as determined by recognized and accepted pharmacological test procedures.

The manner and process of making and using the invention will now be generally described so as to enable a person skilled in the art of chemistry to make and use the same.

The preparation of the tangible embodiments of this invention is illustrated by the following reaction sequence:

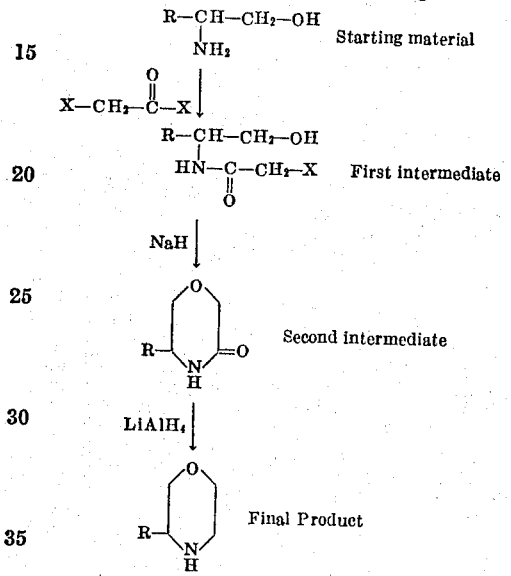

wherein R and X are as described above.

The starting materials for the compound of this invention, ω-phenyl-2-amino-alkan-1-ols, are readily available and may be easily synthesized by reduction with lithium aluminum hydride of an ester of the corresponding acid. For example, 2-amino-3-phenyl propanol-1 (phenylalaninol) is easily prepared by reduction with lithium aluminum hydride of the ethyl ester of dl-phenylalanine.

The initial step in the reaction sequence which leads from the starting material to the first intermediate composition of this invention is the N-haloacetylation of the starting material with a halo-acetyl-halide employing generally the conditions of the classical Schotten-Baumann synthesis.

The second step in the reaction sequence is a dehydrohalogenation and ring closure of the first intermediate to form the aralkyl substituted morpholone which constitutes the second intermediate. This dehydrohalogenation and ring closure is accomplished by treatment of the first intermediate composition with an alkali-metal hydride such as, for example, sodium hydride or potassium hydride, in the presence of an oxygenated inert solvent such as, for example, tetrahydrofuran or dioxane.

The final step in the reaction sequence is the conversion of the aralkyl substituted morpholone to the corresponding aralkyl substituted morpholine by treatment of the former with an alkali metal aluminohydride reducing agent, such as lithium aluminum hydride. The reaction is carried out under reflux in the presence of an inert oxygenated solvent such as tetrahydrofuran, ether and the like. Upon completion of the reaction residual reducing agent is decomposed and the product is recovered by conventional techniques.

The tangible embodiments of this invention, in its final product composition aspect, can, if desired be converted into their non-toxic pharmaceutically acceptable acid-addition and quaternary ammonium salts by conventional techniques. Typical acid-addition salts include the hydrochloride, hydrobromide, citrate, maleate, sulfate, nitrate and the like. Typical quaternary ammonium salts are those formed with such alkyl halides as methyl iodide, n-hexylbromide and the like.

The tangible embodiments of this invention, in its final composition aspect, either as free base or in the form of a non-toxic pharmaceutically acceptable acid addition or quaternary ammonium salt, can be combined with conventional pharmaceutical diluents and carriers, to form such dosage forms as tablets, capsules, solutions, suspensions, suppositories and the like.

The best mode contemplated by the inventor of carrying out this invention will now be set forth as follows:

EXAMPLE

(a) 2-(N-chloroacetylamino)-3-phenylpropanol-1

2-amino-3-phenylpropanol (30 g., 0.2 mole) is dissolved in acetone (300 ml.) and the solution added to a solution of sodium acetate (32.6 g.) in water (150 ml.) in a flask equipped with stirrer and thermometer in an ice bath. A solution of chloroacetyl chloride (22.5 g.) in acetone (50 ml.) is slowly added with stirring and cooling over a period of one hour. The acetone is stripped off shortly after completion of the reaction and the residue is extracted three times with chloroform. The chloroform layer is back-washed, dried and then concentrated to an oil which crystallizes. Ether (250 ml.) is added and the mixture is cooled in a refrigerator. The crystals are filtered off and recrystallized from chloroform/ether yielding 30.9 g. of material, M.P. 92–94° C.

Analysis.—Calculated for $C_{11}H_{14}NO_2Cl$: C, 58.02%; H, 6.20%; N, 6.15%; Cl, 15.57%. Found: C, 57.85%; H, 6.10%; N, 6.32%; Cl, 15.71%.

(b) 5-benzylmorpholone-3

2-(N-chloroacetylamino)-3-phenyl-propanol-1 (75.6 g.), formed as described in step (a) above, is dissolved in dry tetrahydrofuran (1000 ml.) and sodium hydride (23.3 g. of a 49.7% suspension) is slowly added. The reaction mixture is refluxed for 3 hours and then allowed to stand overnight at room temperature. The suspended salts are removed by filtration through a bed of diatomaceous earth and the filter cake is washed with hot tetrahydrofuran. The tetrahydrofuran solution is concentrated in vacuo and the residue is added to water and extracted with chloroform. The washed chloroform solution, dried over anhydrous magnesium sulfate, is concentrated in vacuo, the residue yielding a fraction having a B.P. at 6 mm. Hg. of 155–160° C. The distillate, consisting of two layers, is washed with ether and recrystallized from ether to yield ~21 g. of 5-benzyl-morpholone-3, M.P. 103–105° C.

Analysis.—Calculated for $C_{11}H_{13}NO$: C, 69.09%; H, 6.85%; N, 7.33%. Found: C, 69.38%; H, 6.97%; N, 7.31%.

(c) 3-benzylmorpholine 5-benzylmorpholone-3 (15 g.), formed as described in step (b) above, is dissolved in tetrahydrofuran and slowly added to a mixture of lithium aluminum hydride (10 g.) in tetrahydrofuran (250 ml.). After the completion of the addition the mixture is set to stir and reflux overnight. The material is then decomposed by the cautious addition of water (~70 ml.) and filtered free of suspended salts through a pad of celite. The filter cake is washed with several small portions of tetrahydrofuran and the combined filtrates are concentrated in vacuo. The resulting oil (~15 g.) is dried with potassium hydroxide pellets, transferred to a distilling flask with ether and distilled yielding ~8 g. of 3-benzylmorpholine, B.P. 122–127° C./8 mm. Hg.

Analysis.—Calculated for $C_{11}H_{15}ON$: C, 74.54%; H, 8.53%; N, 7.90%. Found: C, 74.44%; H, 8.22%; N, 7.98%.

The subject matter which the applicant regards as his invention is particularly pointed out and distinctly claimed as follows:

A process of preparing compounds of the formula

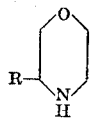

wherein R is phenyl-lower alkyl which comprises treating 2-(phenyl-lower alkyl)-2-aminoethanol with a haloacetyl halide, refluxing the product with an alkali metal hydride and refluxing the resulting 5-(phenyl-lower alkyl) morpholone-3 with a member selected from the group consisting of an alkali metal aluminohydride and an alkali metal borohydride.

References Cited by the Examiner

UNITED STATES PATENTS

| | | | |
|---|---|---|---|
| 1,915,334 | 6/1933 | Salzberg et al. | 260—243 |
| 2,075,359 | 3/1937 | Salzberg et al. | 167—22 |
| 2,362,614 | 11/1944 | Calva | 167—22 |
| 2,375,628 | 5/1945 | D'Alelio et al. | 260—247 |
| 2,732,402 | 1/1956 | Surrey | 260—562 |
| 2,771,468 | 11/1956 | Surrey | 260—247.7 |
| 2,862,967 | 12/1958 | Surrey | 260—562 |
| 2,947,749 | 8/1960 | Winthrop | 260—247.7 |
| 2,993,895 | 7/1961 | Winthrop | 260—247 |
| 3,043,841 | 7/1962 | Siemer et al. | 260—247 |

OTHER REFERENCES

Eddy et al.: J. Econ. Entomology, vol. 39, pages 763–767, 1946.

Smith et al.: J. Econ. Entomology, vol. 42, pages 439–444, 1949.

HENRY R. JILES, Acting Primary Examiner.

JOSE TOVAR, ROBERT L. PRICE,
Assistant Examiners.